(12) United States Patent
Bhattad et al.

(10) Patent No.: US 11,870,633 B2
(45) Date of Patent: Jan. 9, 2024

(54) NR-SS LBT GAP OPTIMIZATIONS

(71) Applicant: QUALCOMM Incorporated, San Diego, CA (US)

(72) Inventors: Kapil Bhattad, Bangalore (IN); Ananta Narayanan Thyagarajan, Bangalore (IN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 17/330,114

(22) Filed: May 25, 2021

(65) Prior Publication Data

US 2021/0281462 A1 Sep. 9, 2021

Related U.S. Application Data

(62) Division of application No. 16/254,262, filed on Jan. 22, 2019, now Pat. No. 11,044,135.

(30) Foreign Application Priority Data

Jan. 23, 2018 (IN) .............................. 201841002680

(51) Int. Cl.
*H04L 27/26* (2006.01)
*H04W 74/08* (2009.01)
(Continued)

(52) U.S. Cl.
CPC ............ *H04L 27/2666* (2013.01); *H04L 5/00* (2013.01); *H04L 5/001* (2013.01); *H04L 5/0066* (2013.01);
(Continued)

(58) Field of Classification Search
None
See application file for complete search history.

(56) References Cited

U.S. PATENT DOCUMENTS

2017/0098612 A1    4/2017  Lin et al.
2019/0052432 A1    2/2019  Islam et al.
(Continued)

FOREIGN PATENT DOCUMENTS

WO    WO-2016129809 A1    8/2016
WO    WO-2018032001 A1 *  2/2018

OTHER PUBLICATIONS

Huawei et al., "Resource Sharing between NR-PDCCH and Data", 3GPP Draft; R1-1713741, 3rd Generation Partnership Project (3GPP), Mobile Competence Centre, 650, Route Des Lucioles; F-06921, Sophia-Antipolis Cedex; France, vol. RAN WG1, No. Prague, Czech Republic; Aug. 21, 2017-Aug. 25, 2017 Aug. 20, 2017, XP051316540, Retrieved from the Internet: URL:http://www.3gpp.org/ftp/Meetings_3GPP_SYNC/RAN1/Docs/ [retrieved on Aug. 20, 2017], Section 3.2, 13 pages.
(Continued)

*Primary Examiner* — Jamaal Henson
(74) *Attorney, Agent, or Firm* — QUALCOMM Incorporated

(57) ABSTRACT

New radio (NR) shared spectrum (NR-SS) listen before talk (LBT) gap optimizations are disclosed in which an indication, such as the preemption indicator, may provide an indication of a communications gap, in which preemptive communications may occur, to a user equipment (UE) currently engaged in communications, whether the preemptive communications are to another UE or network node or through different signal channels. The gap and preemptive communication may be measured in full symbol lengths, sub-symbol lengths, or interlaces. The communication gap may provide sufficient resources for the preempting node to
(Continued)

adequately obtain the shared channel via listen before talk (LBT) procedures, and for the original UE to resume communications after the gap. The communication gap may also be optimally configured in order to provide both the UE and preempting node as much communication resources as possible within the scheduled communication opportunities.

26 Claims, 12 Drawing Sheets

(51) Int. Cl.
    *H04W 72/0446*    (2023.01)
    *H04L 5/00*    (2006.01)
    *H04W 72/23*    (2023.01)

(52) U.S. Cl.
    CPC ....... *H04L 5/0094* (2013.01); *H04W 72/0446* (2013.01); *H04W 72/23* (2023.01); *H04W 74/0816* (2013.01); *H04W 74/0808* (2013.01)

(56) References Cited

U.S. PATENT DOCUMENTS

| | | | |
|---|---|---|---|
| 2019/0059093 A1 | 2/2019 | Cheng et al. | |
| 2019/0098612 A1* | 3/2019 | Babaei | H04W 72/0446 |
| 2019/0229970 A1 | 7/2019 | Bhattad et al. | |
| 2019/0268938 A1* | 8/2019 | Zhao | H04L 5/0055 |
| 2020/0205173 A1* | 6/2020 | Frederiksen | H04W 28/0278 |
| 2020/0351887 A1 | 11/2020 | Miao et al. | |

OTHER PUBLICATIONS

International Preliminary Report on Patentability—PCT/US2019/014690, the International Bureau of WIPO—Geneva, Switzerland, dated Aug. 6, 2020 (181294WO).
International Search Report and Written Opinion—PCT/US2019/014690—ISA/EPO—dated Apr. 8, 2019 (181294WO).
Samsung: "Summary of e-mail Discussions on Multiplexing eMBB and URLLC in DL", 3GPP Draft; R1-1700972 Summary of E-mail Discussion on Multiplexing EMBB and URLLC in DL—Samsung, 3rd Generation Partnership Project (3GPP), Mobile Competence Centre; 650, Route Des Lucioles; F-0692, vol. RAN WG1, No. Spokane, USA; Jan. 16, 2017-Jan. 20, 2017, Jan. 16, 2017 (Jan. 16, 2017), 23 Pages, XP051208487, Retrieved from the Internet: URL: http://www.3gpp.org/ftp/Meetings_3GPP_SYNC/RAN1/Docs/ [retrieved on Jan. 16, 2017] pp. 4-13, 2.1 Indication of preempted or impacted eMBB resources to corresponding eMBB UE(s), Section 2, Appendix 2.
ZTE., et al., "About URLLC and eMBB Multiplexing in Downlink", 3GPP Draft; R1-1700264, 3GPP TSG RAN WG1 AH_NR Meeting, 3rd Generation Partnership Project (3GPP), Mobile Competence Centre, 650, Route Des Lucioles; F-06921, Sophia-Antipolis Cedex; France, vol. RAN WG1, Spokane, USA; Jan. 16, 2017-Jan. 20, 2017, Jan. 10, 2017 (Jan. 10, 2017), XP051202767, pp. 1-10, Retrieved from the Internet: URL:http://www.3gpp.org/ftp/tsg_ran/WG1_RL1/TSGR1_AH/NR_AH_1701/Docs/ [retrieved on—Jan. 10, 2017], Section 2.1.2, Section 2.2.

\* cited by examiner

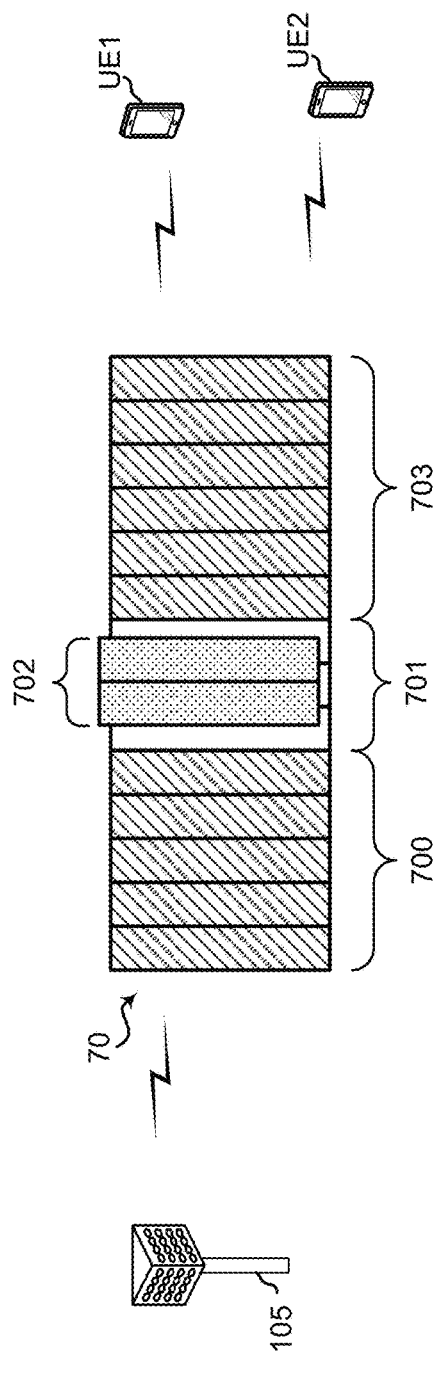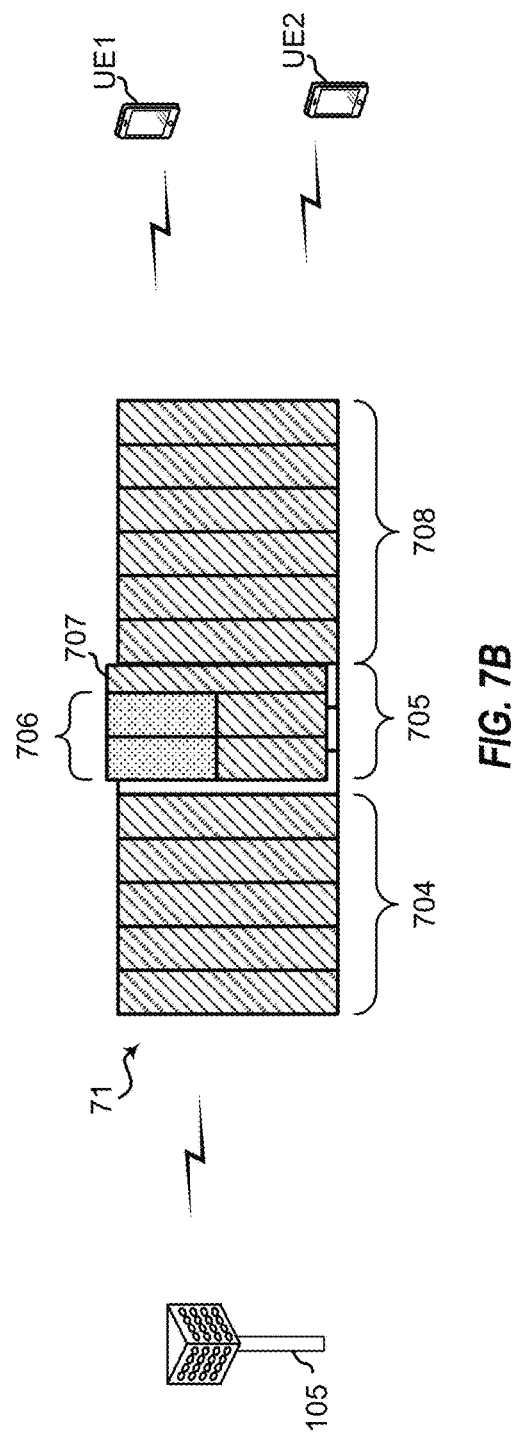

NR-SS LBT GAP OPTIMIZATIONS

CROSS-REFERENCE TO RELATED APPLICATIONS

This application is a divisional of U.S. patent application Ser. No. 16/254,262, entitled, "NR-SS LBT GAP OPTIMIZATIONS," filed on Jan. 22, 2019, and claims the benefit of Indian Provisional Patent Application No. 201841002680, entitled, "NR-SS LBT GAP OPTIMIZATIONS," filed on Jan. 23, 2018, both of which are expressly incorporated by reference herein in their entirety.

FIELD

Aspects of the present disclosure relate generally to wireless communication systems, and more particularly, to new radio (NR) shared spectrum (NR-SS) listen before talk (LBT) gap optimizations.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication, includes receiving, at a UE, an indicator identifying a communication gap preempting a current communication between the UE and a serving base station, identifying, by the UE, a beginning, an end, and a length of the communication gap, puncturing, by the UE, the current communication at the beginning of the communication gap, and resuming, by the UE, the current communication after the length of the communication gap.

In an additional aspect of the disclosure, a method of wireless communication includes receiving, by a UE, a preemptive grant for preemptive communications with a serving base station during current communications on a shared communication channel, wherein the preemptive grant includes at least a sub-symbol offset for a beginning of the preemptive communications, and a length of the preemptive communications, determining, by the UE, whether to perform a listen before talk (LBT) procedure on the shared communication channel, and participating, by the UE, in the preemptive communications according to the preemptive grant.

In an additional aspect of the disclosure, a method of wireless communication includes receiving, by a UE, a preemptive grant for preemptive downlink communications with a serving base station during current communications on a shared communication channel, attempting, by the UE, to decode detected signals at each symbol boundary according to a plurality of decoding hypotheses, and receiving, at the UE the preemptive downlink communications in response to successfully decoding the detected signals.

In an additional aspect of the disclosure, an apparatus configured for wireless communications includes means for receiving, at a UE, an indicator identifying a communication gap preempting a current communication between the UE and a serving base station, means for identifying, by the UE, a beginning, an end, and a length of the communication gap, means for puncturing, by the UE, the current communication at the beginning of the communication gap, and means for resuming, by the UE, the current communication after the length of the communication gap.

In an additional aspect of the disclosure, an apparatus configured for wireless communications includes means for receiving, by a UE, a preemptive grant for preemptive communications with a serving base station during current communications on a shared communication channel, wherein the preemptive grant includes at least a sub-symbol offset for a beginning of the preemptive communications, and a length of the preemptive communications, means for determining, by the UE, whether to perform a LBT procedure on the shared communication channel, and means for participating, by the UE, in the preemptive communications according to the preemptive grant.

In an additional aspect of the disclosure, an apparatus configured for wireless communications includes means for receiving, by a UE, a preemptive grant for preemptive downlink communications with a serving base station during current communications on a shared communication channel, means for attempting, by the UE, to decode detected signals at each symbol boundary according to a plurality of decoding hypotheses, and means for receiving, at the UE the preemptive downlink communications in response to successfully decoding the detected signals.

In an additional aspect of the disclosure, a non-transitory computer-readable medium having program code recorded thereon. The program code further includes code to receive, at a UE, an indicator identifying a communication gap preempting a current communication between the UE and a serving base station, code to identify, by the UE, a beginning, an end, and a length of the communication gap, code to puncture, by the UE, the current communication at the beginning of the communication gap, and code to resume, by the UE, the current communication after the length of the communication gap.

In an additional aspect of the disclosure, a non-transitory computer-readable medium having program code recorded thereon. The program code further includes code to receive, by a UE, a preemptive grant for preemptive communications with a serving base station during current communications on a shared communication channel, wherein the preemptive grant includes at least a sub-symbol offset for a beginning of the preemptive communications, and a length of the preemptive communications, code to determine, by the UE, whether to perform a LBT procedure on the shared communication channel, and code to participate, by the UE, in the preemptive communications according to the preemptive grant.

In an additional aspect of the disclosure, a non-transitory computer-readable medium having program code recorded thereon. The program code further includes code to receive, by a UE, a preemptive grant for preemptive downlink communications with a serving base station during current communications on a shared communication channel, code to attempt, by the UE, to decode detected signals at each symbol boundary according to a plurality of decoding hypotheses, and code to receive, at the UE the preemptive downlink communications in response to successfully decoding the detected signals.

In an additional aspect of the disclosure, an apparatus configured for wireless communication is disclosed. The apparatus includes at least one processor, and a memory coupled to the processor. The processor is configured to receive, at a UE, an indicator identifying a communication gap preempting a current communication between the UE and a serving base station, to identify, by the UE, a beginning, an end, and a length of the communication gap, to puncture, by the UE, the current communication at the beginning of the communication gap, and to resume, by the UE, the current communication after the length of the communication gap.

In an additional aspect of the disclosure, an apparatus configured for wireless communication is disclosed. The apparatus includes at least one processor, and a memory coupled to the processor. The processor is configured to receive, by a UE, a preemptive grant for preemptive communications with a serving base station during current communications on a shared communication channel, wherein the preemptive grant includes at least a sub-symbol offset for a beginning of the preemptive communications, and a length of the preemptive communications, to determine, by the UE, whether to perform a LBT procedure on the shared communication channel, and to participate, by the UE, in the preemptive communications according to the preemptive grant.

In an additional aspect of the disclosure, an apparatus configured for wireless communication is disclosed. The apparatus includes at least one processor, and a memory coupled to the processor. The processor is configured to receive, by a UE, a preemptive grant for preemptive downlink communications with a serving base station during current communications on a shared communication channel, to attempt, by the UE, to decode detected signals at each symbol boundary according to a plurality of decoding hypotheses, and to receive, at the UE the preemptive downlink communications in response to successfully decoding the detected signals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 7A and 7B are block diagrams illustrating base station, UE1, and UE2 configured according to one aspect of the present disclosure.

DETAILED DESCRIPTION

Figure 1:
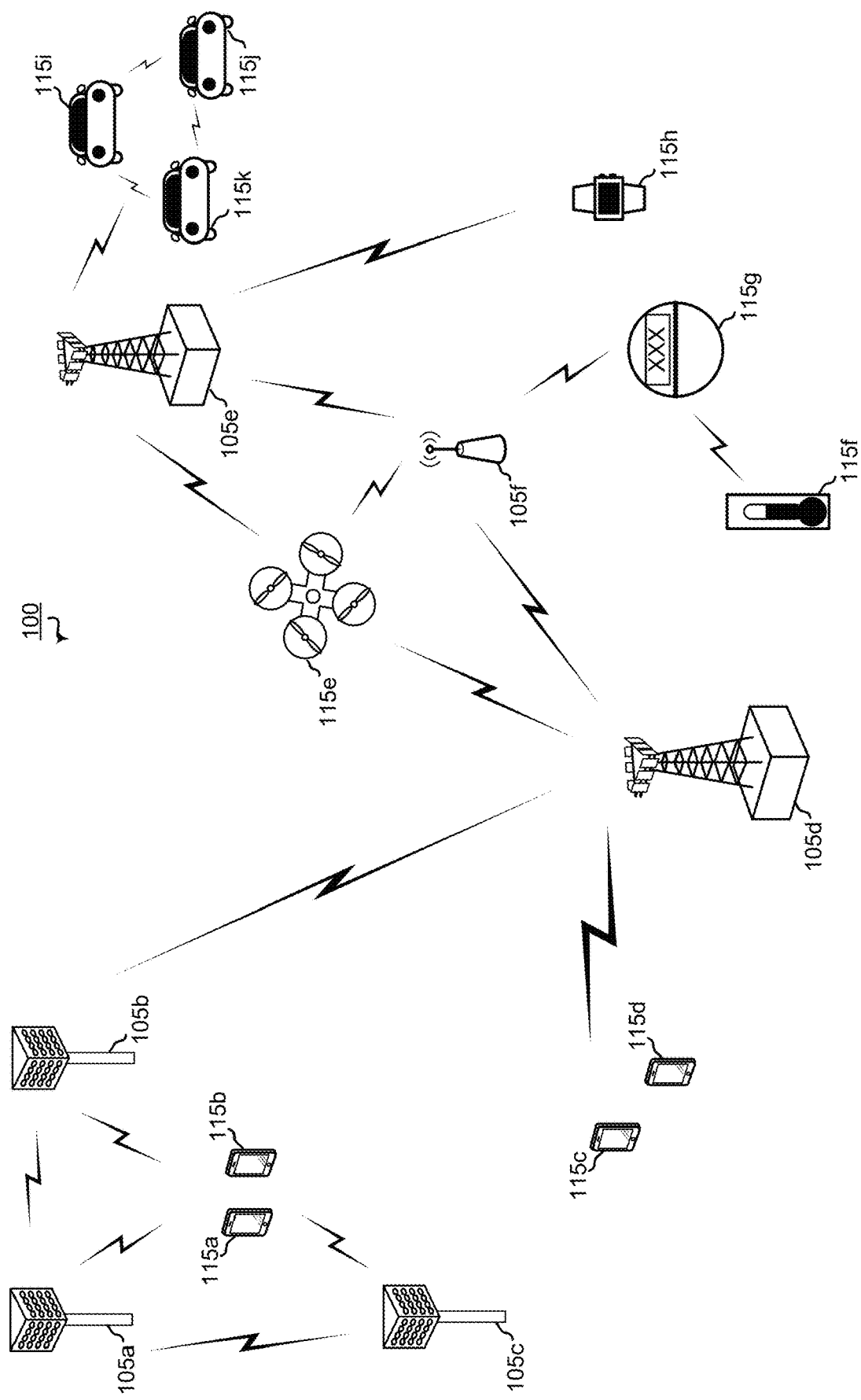
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
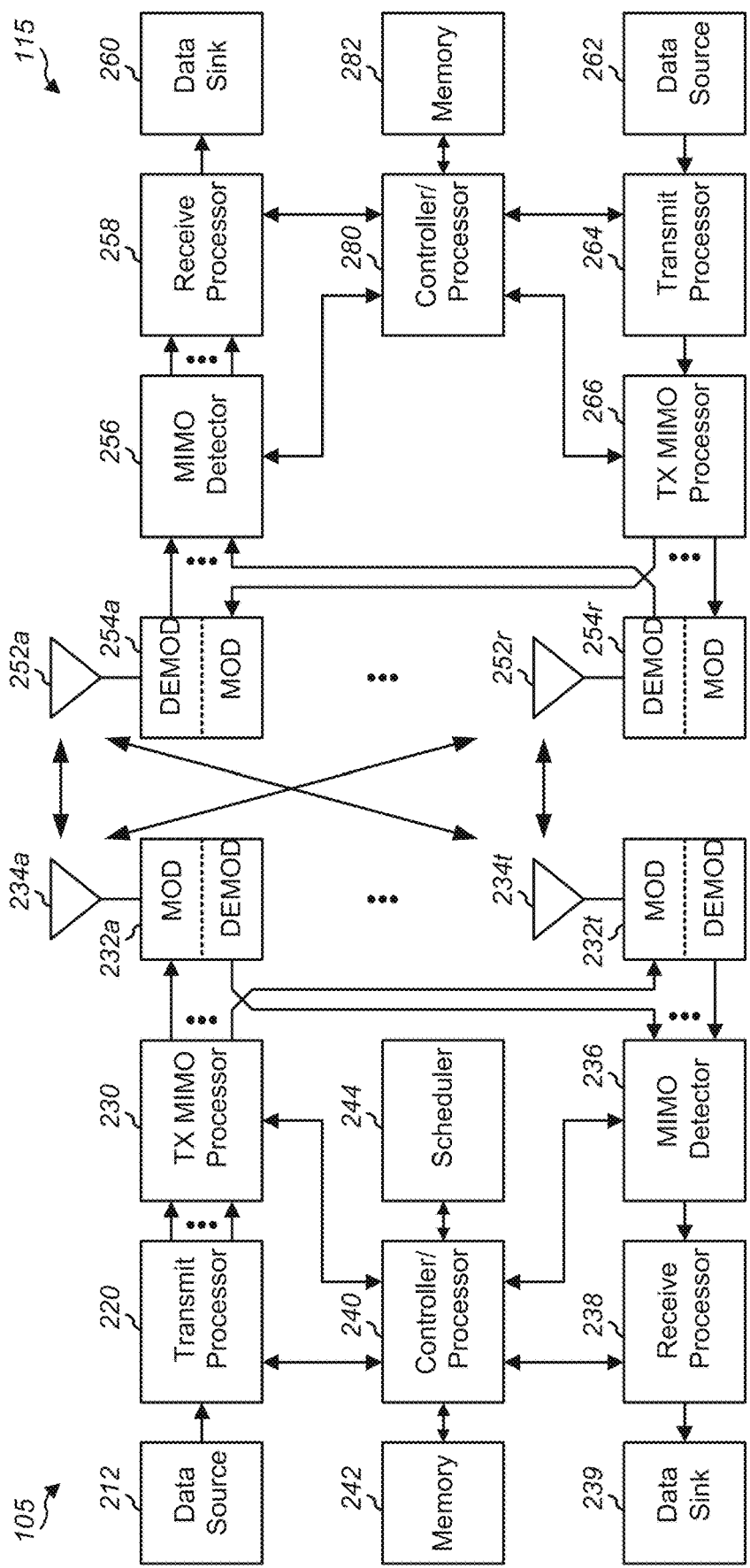
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4, 6, and 9, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
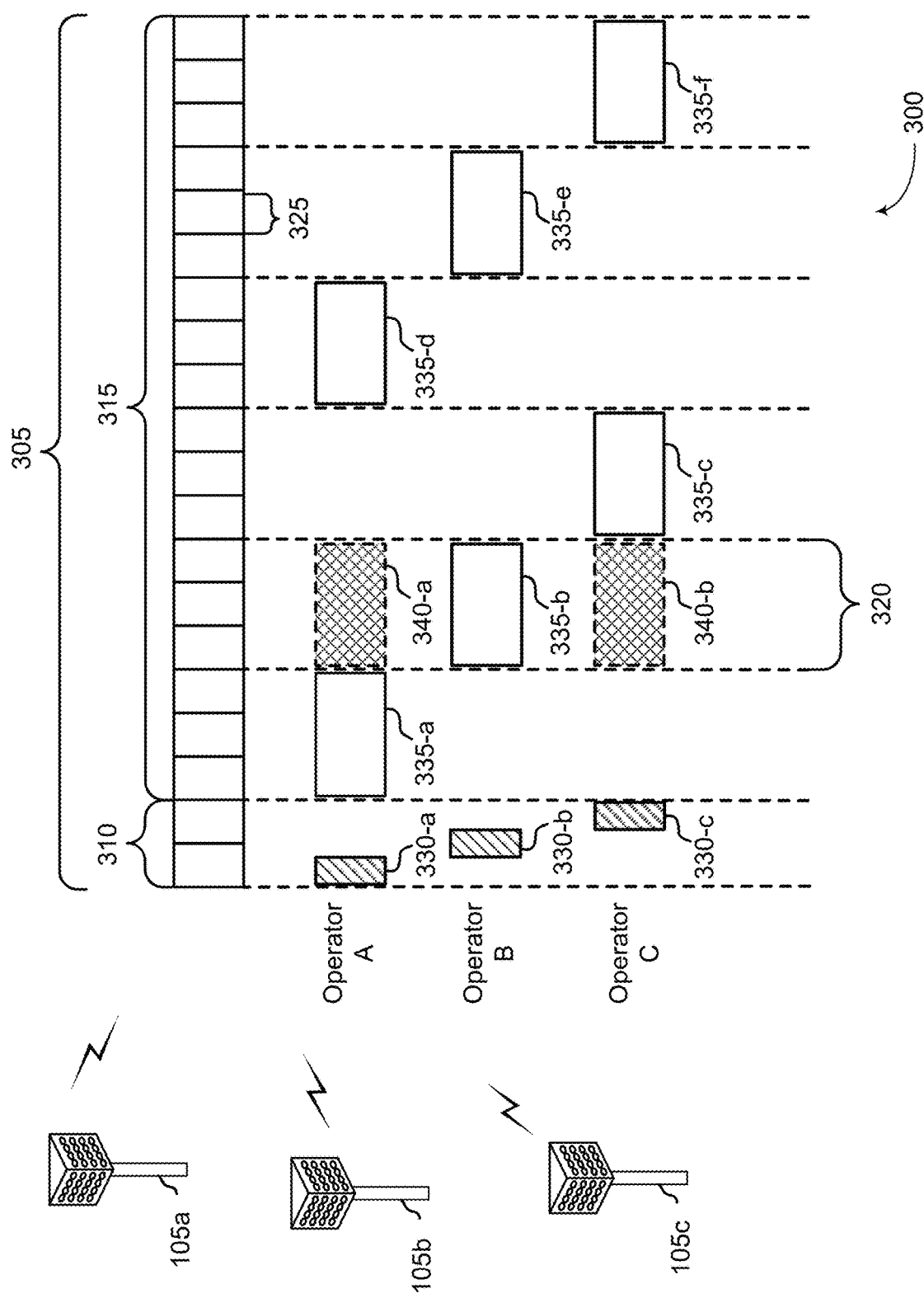
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Uplink (UL) mini-slot in NR operations may involve scheduling a short preemptive duration for a UE that has preemptive communications to make. The UE having the preemptive communications may be referred to herein as a UE2, while the UE performing the on-going communications that are preempted may be referred to as a UE1. Preemptive communications may include a variety of different communications that have been given a higher priority than the on-going communications of another UE. For example, the preemptive communications may include ultra-reliable low-latency communications (URLLC), communications from a higher priority UE, and the like. The UE1 may be participating in lower-priority communications, including enhanced mobile broadband (eMBB) communications, or communications from a UE that has a lower priority than the UE2.

Also applicable to URLLC may be to allow high-priority data of UE2 in the middle of UE1 transmissions. The scheduling of the URLLC data/preemption may be performed through an anchor carrier in an enhanced license assisted access (eLAA) deployment with transmissions in an unlicensed carriers may be in addition to parallel transmissions in the licensed carrier. However, when considering NR shared spectrum (NR-SS) operations, the UE2 will perform an LBT procedure before it can transmit on the shared communication channel. Because it is attempting to transmit within the current communications of UE1, UE2 would detect the UE1 signal and, thus, not transmit because of a failed LBT. Similarly, for UE1, when it transmits after the scheduled communication gap for the preemptive UE2 communications, UE1 will also perform LBT on the shared channel. If there is no gap between the UE2 transmissions and the UE1 resuming transmission, the UE1 would detect the UE2 signal and also not transmit because of a failed LBT. Various aspect of the present disclosure are directed to an LBT gap being indicated through a preemption indicator (PI) communicated by the serving base station.

Figure 4:
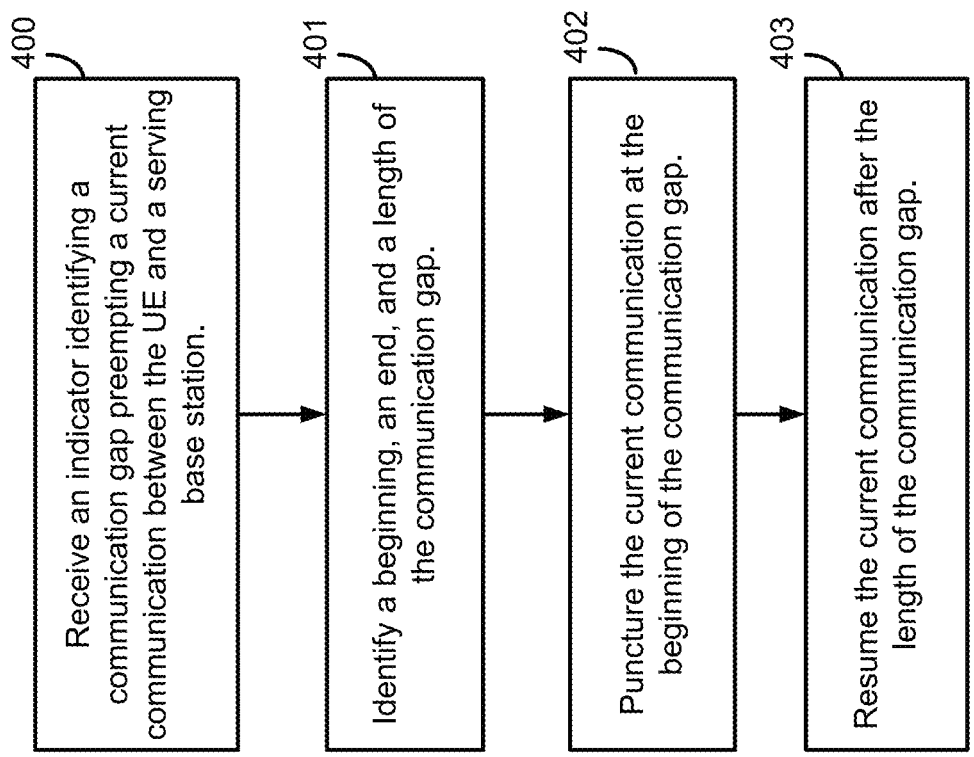
FIG. 4 is a block diagram illustrating example blocks executed to implement one aspect of the present disclosure.
Figure 12:
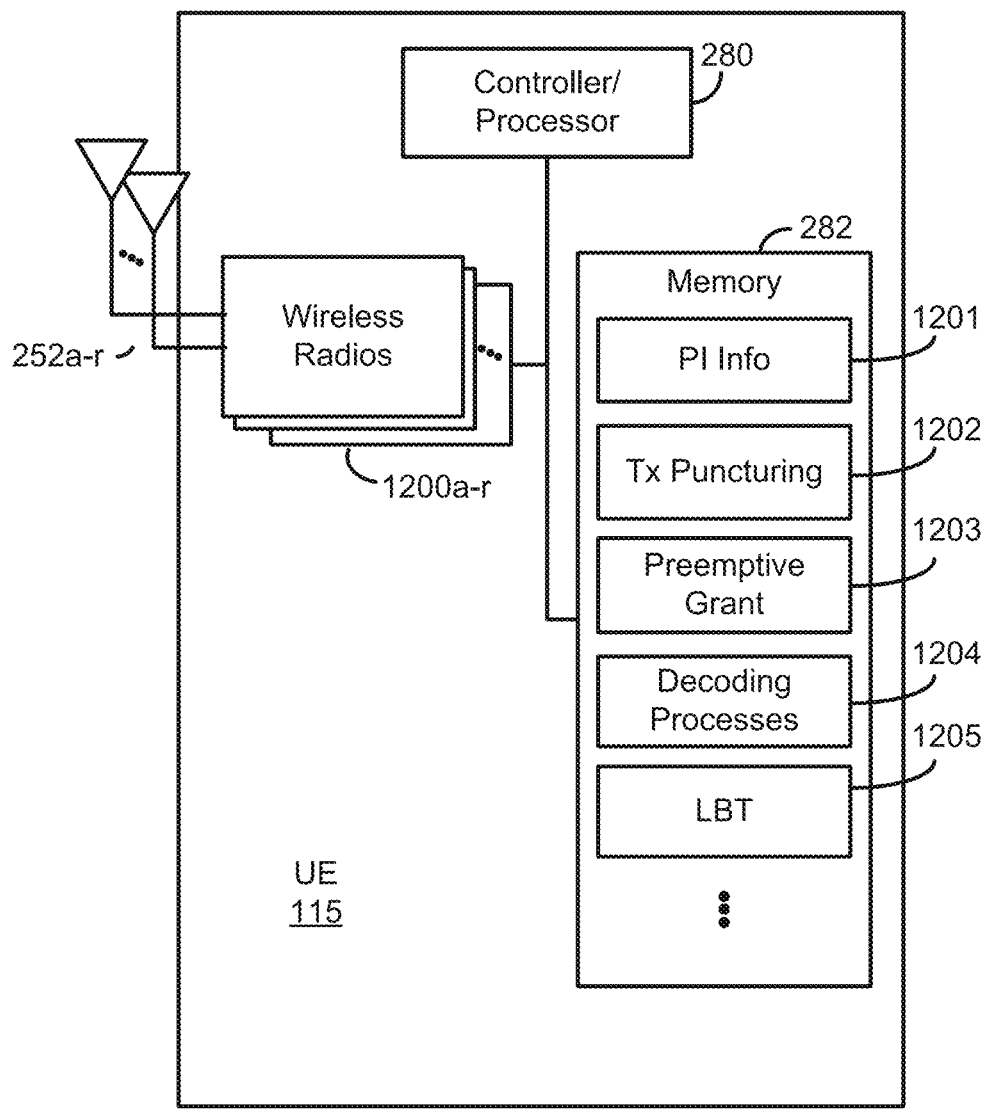
FIG. 12 is a block diagram illustrating an example UE configured according to aspects of the present disclosure.

FIG. 4 is a block diagram illustrating example blocks executed to implement one aspect of the present disclosure. The example blocks will also be described with respect to UE 115 as illustrated in FIG. 12. FIG. 12 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1200a-r and antennas 252a-r. Wireless radios 1200a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE1 receives an indicator identifying a communication gap preempting a current communication between the UE1 and a serving base station. For example, a UE, such as UE 115, may receive a PI from the serving base station that identifies a communication gap within the current communications of UE 115. PI is received from the serving base station via antennas 252a-r and wireless radios 1200a-r and stored, under control of controller/processor 280, in memory 282 at PI information 1201. For purposes of the example aspect illustrated in FIG. 4, UE 115 may operate as an eMBB UE.

At block 401, the UE1 identifies a beginning, an end, and a length of the communication gap. The information contained within PI information 1201 allows UE 115, under control of controller/processor 280, to determine which slots, symbols, or interlaces to puncture to accommodate a preemptive communication from a neighboring node, which may be another eMBB UE, a neighboring priority UE, such as a URLLC UE, a base station, or the like. In FDM operations the communication gap may be defined by identified frequency, which may be one or more bandwidth parts (BWP) or frequency interlaces. The information contained within PI information 1201 may define the exact resources for UE 115 to puncture or may provide information on the resources that the preemptive communication will use which allows UE 115 to determine the resources that it will puncture to provide the communication gap. In example implementations, the gap would be sufficient to allow the intervening node to perform an LBT before transmitting.

At block 402, the UE1 punctures the current communication at the beginning of the communication gap. With the details of the communication gap determined by UE 115, UE 115, under control of controller/processor 280, executes transmit puncturing 1202, in memory 282. The execution environment of transmit puncturing 1202 provides for UE 115 to stop scheduled transmissions to create a communication gap for intervening preemptive communications. UE 115, within the execution environment of transmit puncturing 1202 punctures its current communications to exit the shared medium and allow the preemptive node to transmit.

At block 403, the UE1 resumes the current communication after the length of the communication gap. Once the time for the communication gap has passed, UE 115 may resume the current communications. For example, UE 115 may resume eMBB communications via wireless radios 1200a-r and antennas 252a-r. Various example aspects may provide for UE 115 to perform an LBT procedure prior to resuming communications on the shared channel. In such aspect, UE 115 would, under control of controller/processor 280, execute LBT logic 1205. The execution environment of LBT logic 1205 allows UE 115 to perform LBT of a given shared communication channel.

Figure 5A:
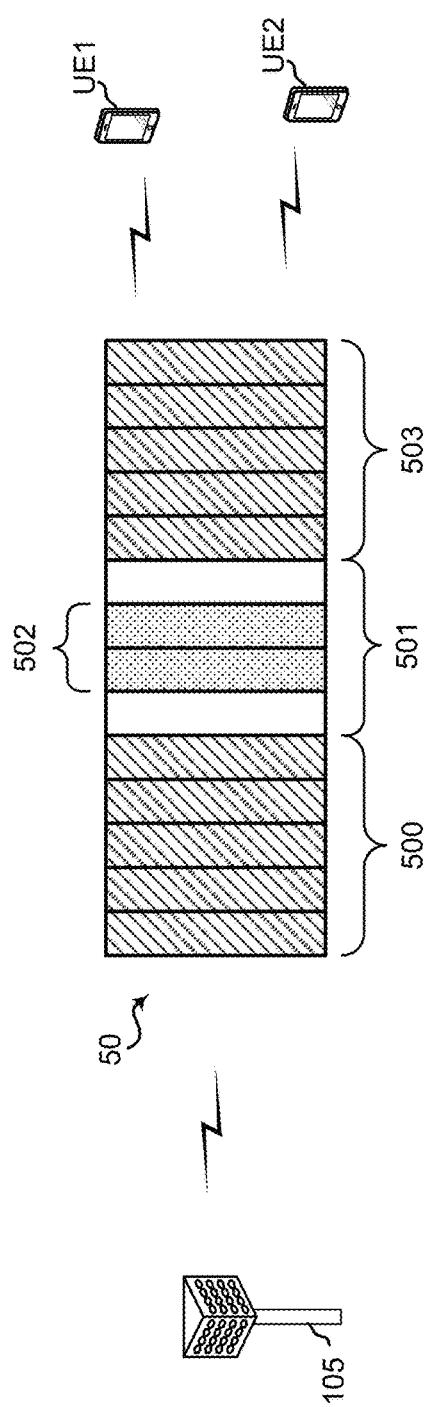
FIGS. 5A and 5B are block diagrams illustrating a base station, UE1, and UE2, configured according to aspects of the present disclosure.
Figure 5B:
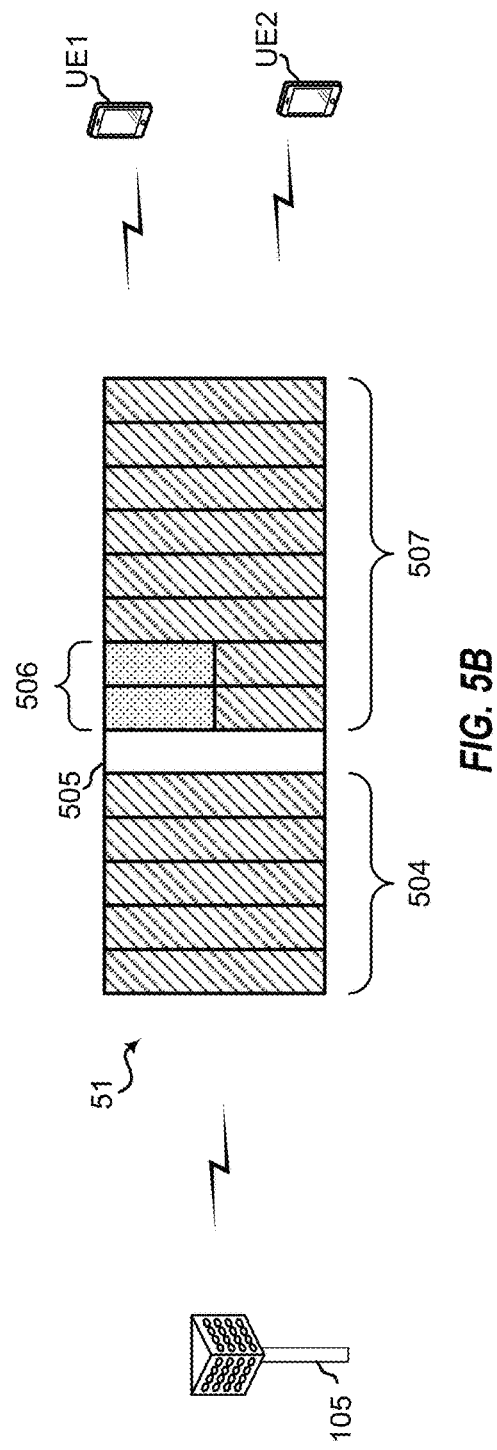

FIGS. 5A and 5B are block diagrams illustrating base station 105 and UE1 and UE2, configured according to aspects of the present disclosure. According to the various aspects of the present disclosure, LBT gaps may be introduced both before and after the preemptive communications where time division multiplex (TDM) operations are conducted (FIG. 5A), or on the beginning side of the preemptive communication if there are no UEs that are purely in TDM operations 50 and in frequency division multiplex (FDM) operations 51 (FIG. 5B). For URLLC, the NR preemption indicator (PI) can be used to indicate the number of UE1 symbol holes to be punctured for the UE2 URLLC transmission. In TDM operations 50, UE1 receives the PI from base station 105, which identifies to UE1 to puncture communication gap resources 502 during current communications 500. UE1 symbol holes are punctured in communication gap resources 502 for the duration of the UE2 transmission 503 plus an extra number of symbols for a guard period (GP), which can be a partial symbol. UE1 would resume current communications 504 after the second GP.

In FDM operations 51, UE1 receives the PI from base station 105 to determine the communication gap resources 506. FDM operations 51 would only use a single or partial punctured symbol at the beginning of communication gap resources 506 for UE2 to perform LBT. Upon successful LBT, UE2 would perform preemptive communications 507 covering the frequency identified in the FDM grant from base station 105. UE1 may continue current communications 508 in different frequencies during preemptive communications 507 and then over the allocated frequencies after preemptive communications 507.

It should be noted that the definition of preempted resources in NR may be modified to allow for such LBT gaps. For example, NR may only allow preemption sizes of 2/7 symbols that may be the supported slot sizes for minislots/URLLC. However, for NR-SS the supported preemption sizes may be changed in order to accommodate the LBT gaps.

In NR, the PI generally indicates the resources that the eMBB UE (UE1) will puncture for the communication gap. The PI indication in NR has two formats: (1) a 14 bit bitmap for the time domain symbols to puncture; and (2) a 7×2 bit bitmap for sets of OFDM symbols in time×2 for puncturing in the frequency domain (bandwidth part). Note that in both formats, each bit of the bitmap corresponds to a group of OFDM symbols.

It should be noted that for NR-SS operations, the frequency domain resource indication may be changed to a set of interlaces, instead of bandwidth parts, as allocation will likely be done in units of interlaces.

The information contained within the PI may be configured in multiple formats. In a first optional aspect, the PI indicates the resources that the eMBB UE (UE1) will puncture for the communication gap. The serving base station may consider all the gaps needed for the preemptive transmission and capture those gap resource in the bitmap of the PI. When the SCS configuration is different for the eMBB UE (UE1) and the URLLC UE (UE2), the number of symbols may not perfectly align. Because each bit corresponds to a group of symbols, even though only one group of symbols may be allocated for the preemptive communication, the PI will create an LBT gap by blanking/puncturing the entire group of symbols prior to and after the symbol group(s) used for the preemptive transmission.

In a second optional aspect, the PI may indicate the resources (e.g., SCS and/or time frequency resources) to be used by the URLLC UEs (UE2). In such aspects, the eMBB UE (UE1) uses its own SCS and the LBT requirement to determine how much additional time/frequency resources should be punctured to create the applicable communication gap. For example, in a scenario where 2 symbols should be punctured for the preemptive communication with SCS of 15 KHz, and for an eMBB UE (UE1) having an SCS of 15

KHz, there are 14 uplink symbols in 1 ms. Therefore, the communication gap should be 4 symbols (2 URLLC symbols+2 gap symbols). If the UE1 has an SCS of 30 KHz, there are 28 uplink symbols in 1 ms, which would mean that 6 symbols should be punctured for the communication gap. It should be noted that the SCS is the inverse of symbol length. Thus, as the SCS becomes larger, the symbol length becomes inversely shorter, and vice versa. In such an example scenario, each URLLC symbol having an SCS of 15 KHz would span 2 symbols of the UE1 having an SCS of 30 KHz. Two symbols of gap before and after the preemptive communication may be used for LBT procedure. One symbol with 30 KHz SCS may also be sufficient for an LBT gap.

Figure 6:
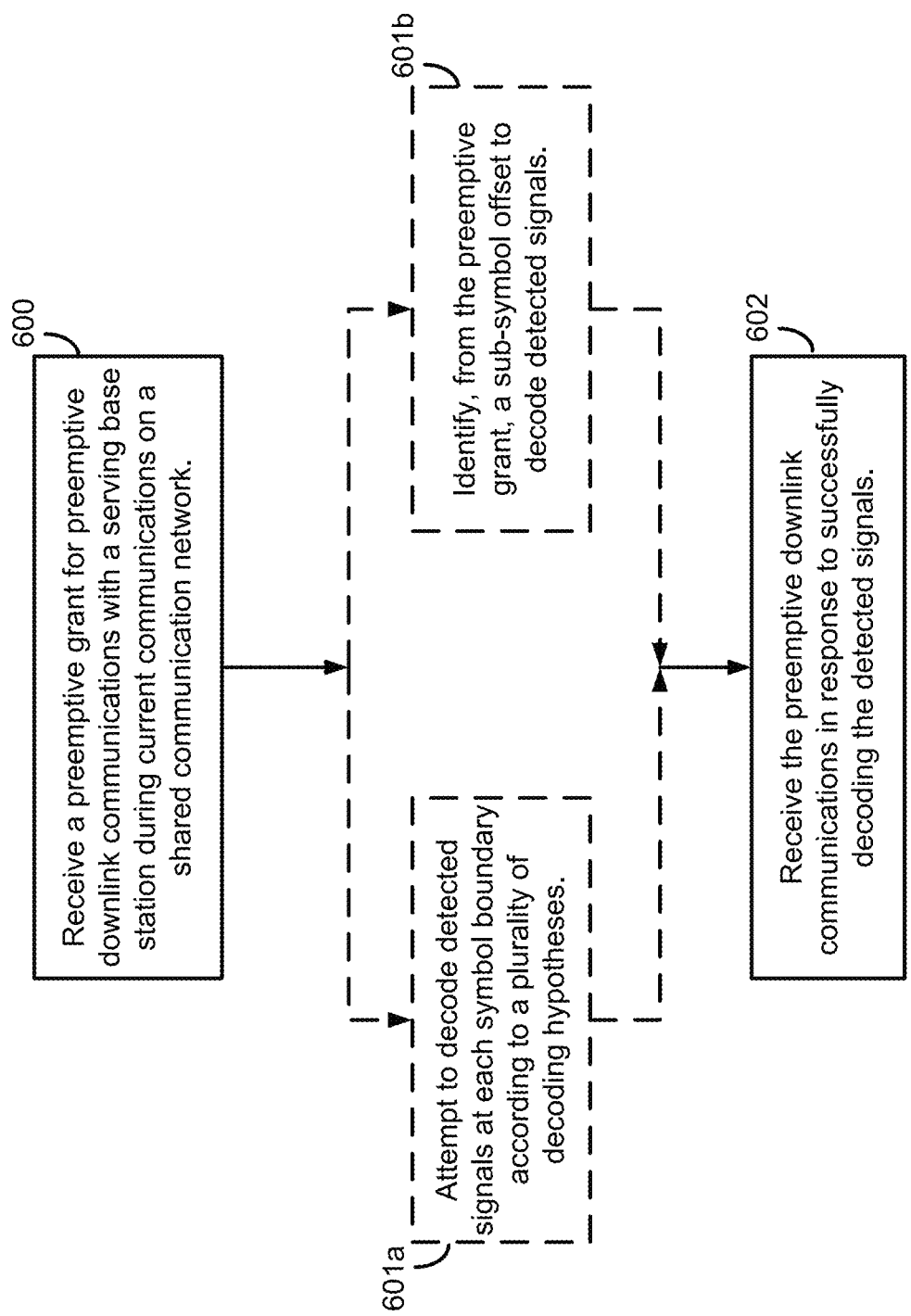
FIG. 6 is a block diagram illustrating example blocks executed to implement one aspect of the present disclosure.

FIG. 6 is a block diagram illustrating example blocks executed to implement one aspect of the present disclosure. When the UE2 (URLLC UE) monitors for URLLC data, it should receive the data regardless of how the transmission switch occurs. In the illustrated aspect, the UE2 may attempt multiple hypotheses for each OFDM symbol boundary. The example blocks will also be described with respect to UE 115 as illustrated in FIG. 12. At block 600, a UE2 receives a preemptive grant for preemptive downlink communications with a serving base station during current communications on a shared communication network. For example, a priority UE, such as UE 115, may receive a downlink grant via antennas 252a-r and wireless radios 1200a-r identifying the preemptive communication during the communications of a neighboring non-priority UE. For purposes of the example illustrated in FIG. 6, UE 115 operates as a priority UE, such as a URLLC UE.

At block 601a, the UE2 attempts to decode detected signals at each symbol boundary according to a plurality of decoding hypotheses. Because the communication channel is shared, there is no guarantee that the serving base station will secure the channel. In order to receive the preemptive downlink communication, UE 115 will attempt multiple hypotheses at each OFDM symbol boundary. UE 115, under control of controller/processor 280 accesses the multiple hypotheses at decoding processes 1204, stored in memory 282. The hypotheses are then used by decoders within wireless radios 1200a-r to attempt to decode the received signals. Block 601a is a first alternative block that may be executed in various aspects of the present disclosure.

In alternative to block 601a, at block 601b, the UE2 identifies, from the preemptive grant, a sub-symbol offset to decode detected signals. Where the example aspect includes sub-symbol operations, UE 115 may detect the sub-symbol offset, which may be included in preemptive grant 1203, stored in memory 282. UE 115 would use the sub-symbol offset to decode signals detected and received from antennas 252a-r and 1200a-r.

At block 602, the UE2 receives the preemptive downlink communications in response to successfully decoding the detected signals. UE 115 receives the preemptive downlink communications via antennas 252a-r and wireless radios 1200a-r. If downlink transmissions are made, UE 115 may successfully decode the transmissions using one of the hypotheses from decoding processes 1204 in decoders located within wireless radios 1200a-r.

FIGS. 7A and 7B are block diagrams illustrating base station 105 and UE1 and UE2 configured according to one aspect of the present disclosure. Additional aspects of the present disclosure provide for sub-symbol offsets for OFDM symbols that provide LBT gaps having sub-symbol shifts. In order to reduce the overhead, sub-symbol gaps and provided instead of full symbol gaps. FIG. 7A illustrates TDM operations 70, in which sub-symbol gaps are provided on both sides of the preemptive communications from UE2. UE1 receives an indicator from the serving base station (e.g., PI) that identifies communication gap 701. According to the present aspect, the base station assigns a sub-symbol offset to preemptive communications 702 by UE2. The sub-symbol offset shifts the preemptive transmission resources off of the symbol boundary. Thus, as UE1 performs current communication 700, it punctures three symbols for communication gap 701 to accommodate the sub-symbol shifted preemptive communications 702. The resulting gaps before and after preemptive communications 702 are less than a full symbol in length, which conserves resources over a full-symbol gap. UE1 may resume current communications 703 after the second gap, which may occur with or without an LBT, depending on the configuration and characteristics, such as the length of communication gap 701 or the length of the second gap.

FIG. 7B illustrates FDM operations 71, in which a sub-symbol gap is defined at the beginning of communication gap 705 prior to preemptive communication 706 of UE2. UE1 receives the PI from base station 105 indicating the parameters for communication gap 705. UE1 punctures the current communications creating a sub-symbol gap without communications for UE2 to perform LBT prior to preemptive transmission 706. UE1 may then transmit dummy transmission 707 in the sub-symbol after UE2 completes preemptive transmission 706. In the sub-symbol offset designs illustrated in FIGS. 7A and 7B, UE2 transmission symbols are not symbol aligned with the original frame structure of current communications 704 of UE1. However, it reduces the amount of wasted resources for gaps in the pure TDM case (FIG. 7A). After dummy transmission 707, UE1 may resume current communications 708.

Figure 8A:
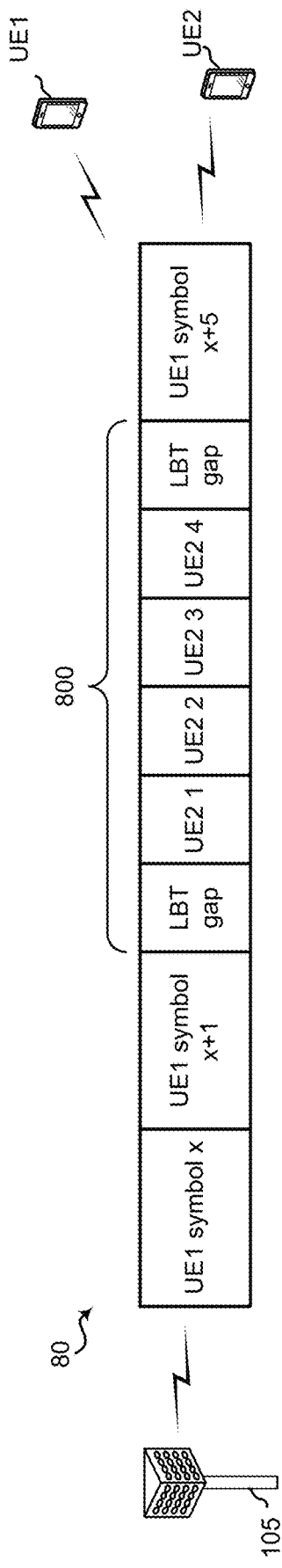
FIGS. 8A and 8B are block diagrams illustrating base station, UE1, and UE2 configured according to one aspect of the present disclosure.
Figure 8B:
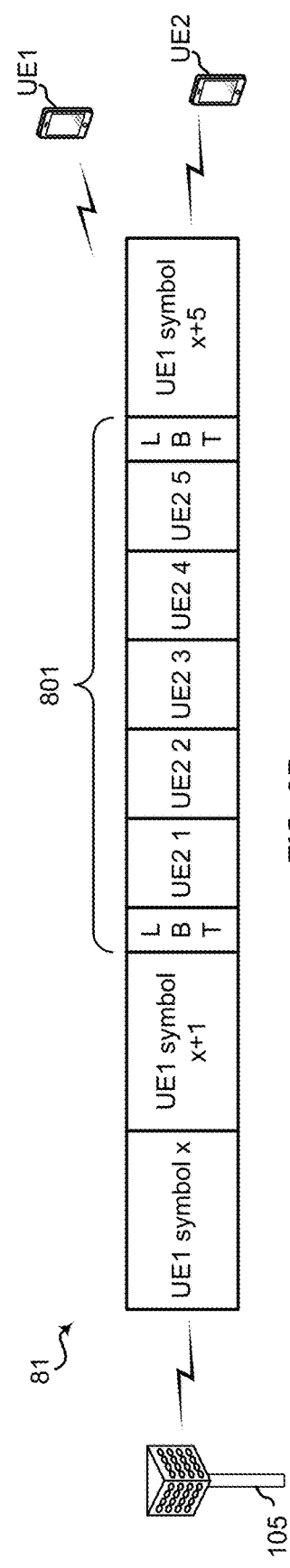

FIGS. 8A and 8B are block diagrams illustrating base station 105 and UE1 and UE2 configured according to one aspect of the present disclosure. The sub-carrier spacing (SCS) of the two different UEs (UE1 and UE2) may be different. FIG. 8A illustrates a shared communication channel 80 in which UE2 is configured with a larger SCS than UE1 and the OFDM symbols of the preemptive communications of UE2 are aligned with the symbols of the current communications of UE1. Accordingly, the symbol size of UE1 transmissions (UE symbol x, symbol x+1, x+5) are larger than the symbol size of UE2 transmissions (UE2 1-4).

FIG. 8B illustrates a shared communication channel 81, where the preemptive communications are at a sub-symbol offset. As indicated above, the different SCS configurations allow a shorter symbol length for the UE2 communications. However, by using the sub-symbol offset, UE2 is able to complete more transmission symbols (UE2 1-5) of URLLC uplink data over the same communication gap size (communication gap 801) as the full symbol gap (communication gap 800) illustrated in FIG. 8A.

For uplink mini-slots, the downlink control information (DCI) may schedule the time domain resources for the UE2 preemptive communication in the middle of current communications of the UE1. The sub-symbol level resource control may be any portion of the full symbol length. The TDM resource allocation in the DCI can also indicate the sub-symbol level resource allocation for the UE2 preemptive communication. For large SCS the symbol duration becomes smaller and, hence, the benefits for the sub-symbol offset option may be reduced.

It should be noted that when the UE2 preemptive communication is based on autonomous uplink (AUL) operations, the AUL radio resource control (RRCj) configuration/ activation/information may be determined from the PI, which may be used to determine the offset for the symbol boundaries.

Figure 9:
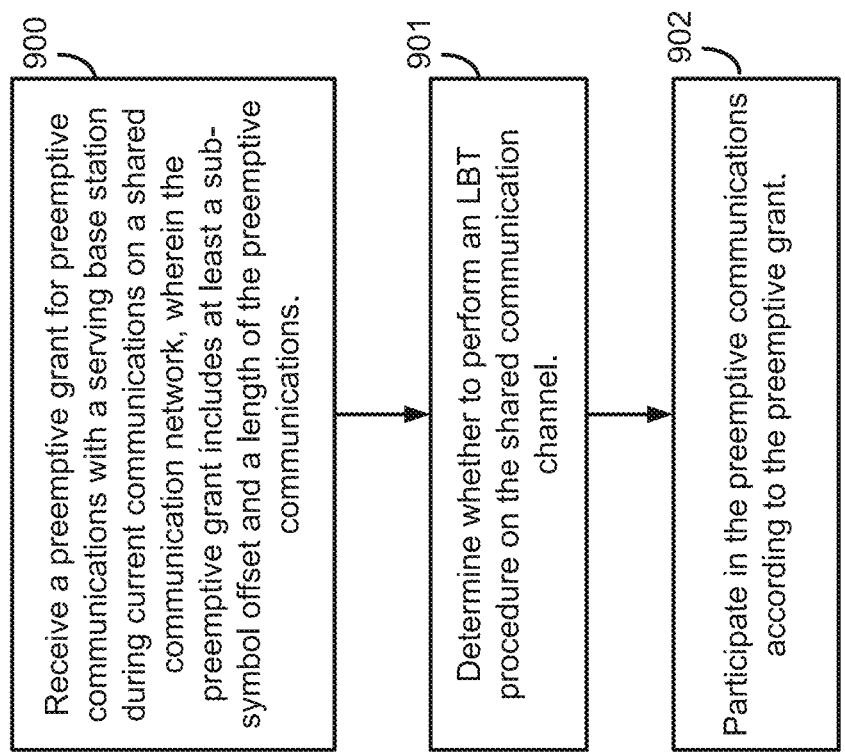
FIG. 9 is a block diagram illustrating example blocks executed to implement one aspect of the present disclosure.

FIG. 9 is a block diagram illustrating example blocks executed to implement one aspect of the present disclosure. The example blocks will also be described with respect to UE 115 as illustrated in FIG. 12. At block 900, a UE2 receives a preemptive grant for preemptive communications with a serving base station during current communications on a shared communication network, wherein the preemptive grant identifies a sub-symbol offset for the preemptive communications. When preemptive communications are available (e.g., uplink/downlink) UE 115 may receive a communications grant for the preemptive communications from the serving base station via antennas 252a-r and wireless radios 1200a-r. For purposes of the example aspect illustrated in FIG. 9, UE 115 may operate as the priority UE (e.g., UE2).

At block 901, the UE2 determines whether to perform an LBT procedure on the shared communication channel. UE 115 executes, under control of controller/processor 280, LBT logic 1205, stored in memory 282. Within the execution environment of LBT logic 1205, UE 115 may determine whether to perform LBT prior to transmissions. LBT for the preemptive communications may or may not be performed, depending on the configuration of the network operations as well as certain characteristics existing for the communication opportunity. For example, in certain aspects, UE 115 may always perform LBT during the first gap prior to the preemptive transmission. Additional aspects may provide for no LBT when certain conditions are satisfied. For example, no LBT may be necessary if the preemptive transmission may occur during the transmission opportunity of the serving base station. Because the base station has reserved the shared channel for a certain standard period, if the preemptive transmissions were to occur during that transmission opportunity, there would be no need to perform LBT. Additionally, whether or not an LBT should be performed may be determined based on the size of the gap between the start of the punctured resources of communication gap and the beginning of the preemptive communications. A gap exceeding a predetermined threshold may trigger UE 115 to perform LBT, while the gap being within the predetermined threshold would allow UE 115 to perform the preemptive transmission without LBT. A further aspect provides for the serving base station to signal whether or not LBT should be performed by UE 115.

At block 902, the UE2 participates in the preemptive communications according to the preemptive grant. Once the LBT has either been successfully performed or the determination made that no LBT is needed, as provided within the execution environment of LBT logic 1205, UE 115 may participate in the preemptive communication as configured in the grant via wireless radios 1200a-r and antennas 252a-r.

As the communication gap and preemptive communications may be configured with sub-symbol resources, the participating network nodes may use mini-symbols to communicate according to various aspect of the present disclosure.

Figure 10:
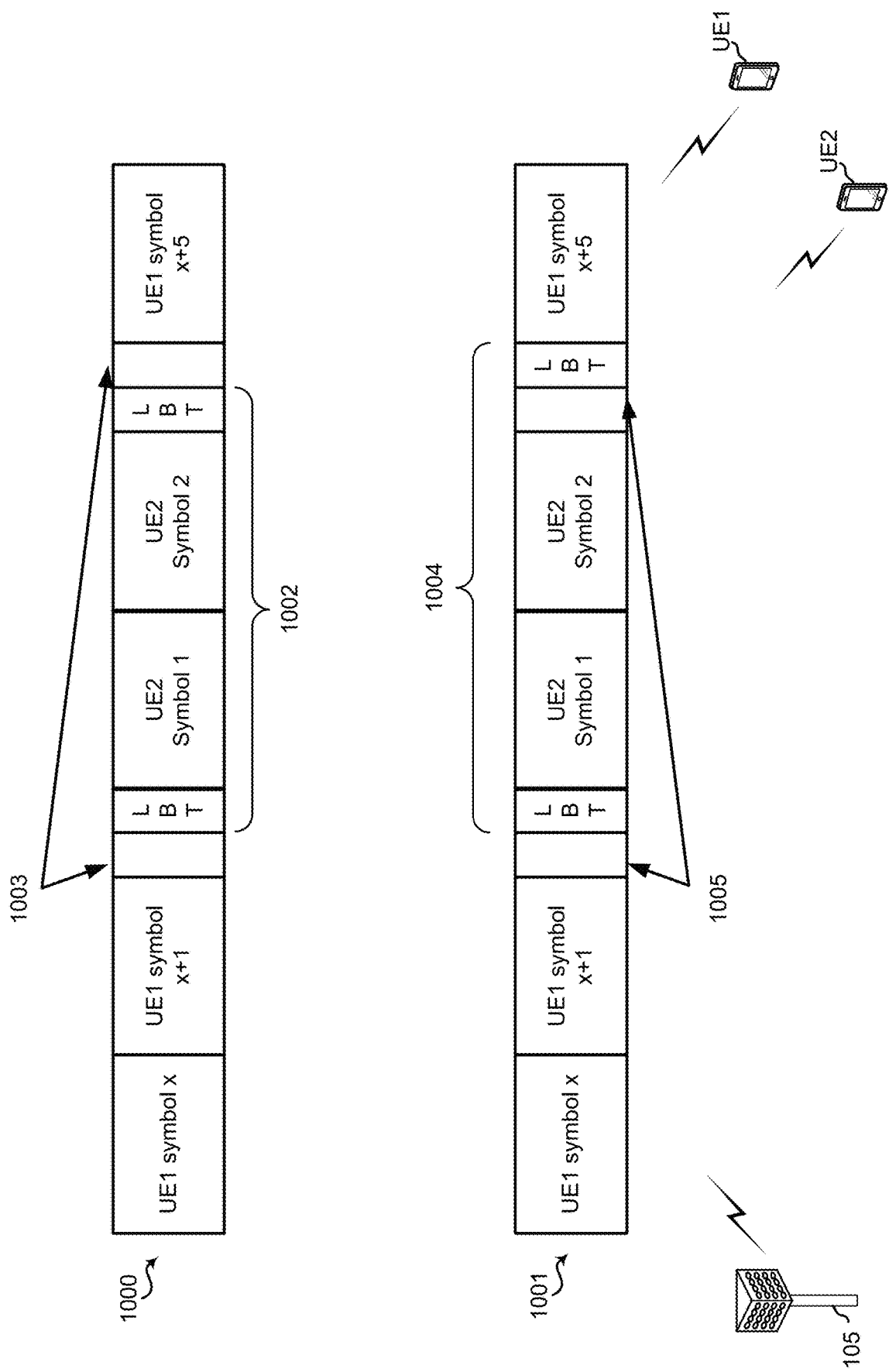
FIG. 10 is a block diagram illustrating base station, UE1, and UE2 configured according to one aspect of the present disclosure.

FIG. 10 is a block diagram illustrating base station 105, UE1, and UE2 configured according to one aspect of the present disclosure. According to the illustrated examples, mini symbols, having different SCS, may be used in order to reduce LBT gaps. Communication stream 1000 illustrates a sub-symbol offset for communication gap 1002 and provides for UE1 to receive a dynamic change in SCS configuration in the PI. The dynamic SCS change allows UE1 to continue transmissions 1003 prior to the sub-symbol gaps before and after the preemptive communication of UE2 using a mini-symbol defined by the changed SCS. Communication stream 1001 illustrates a sub-symbol offset for communication gap 1004 and provides for both UE1 to receive the dynamic SCS change in a PI and UE2 to receive the dynamic SCS configuration within the URLLC grant. The dynamic change in SCS allows for UE1 to transmit 1005 in a mini-symbol prior to the first LBT gap before the preemptive transmission of UE2, and allows UE2 to transmit 1005 a mini-symbol prior to the ending sub-symbol gap where UE1 may perform LBT to resume current communications.

In an additional aspect that may be illustrated by FIG. 10, even though UE1 (the eMBB UE) is shown to create sub-symbol gaps, UE1 may be allowed to transmit for portion of the symbol to avoid other UEs obtaining access to the medium and leaving just the minimum gap to enable UE2 a successful LBT. UE1 will have knowledge of UE2 and its LBT operations, in order to determine the minimum gap that still allows UE2 to successfully complete the LBT procedure. Similarly, although UE2 is shown to have the sub-symbol to do the measurement, its transmission aligns to the mini-slot or URLCC symbol boundary. UE2 may perform the LBT procedure prior to the mini-slot boundary and start transmitting dummy signals to reserve access to the shared communication channel. For example, if UE1 does not transmit at 1005, UE2 may perform LBT and begin transmitting channel reserving signals at 1005 prior to the scheduled LBT mini-slot. Once the scheduled resource arrives, UE2 may then begin the preemptive communication (UE2 symbol 1, symbol 2). Additionally in the sub-symbol that UE2 leaves a gap at the end of the preemptive communication, UE2 may determine the minimum gap for UE to perform a successful LBT. UE2 transmits for more time and leaves enough gap for UE1 to do LBT successfully. As above, UE2 would have information on UE1 and its LBT operations in order to determine the minimum gap for UE1 LBT.

Aspects of the present disclosure may be used for various preemptive communications. For example, the sub-symbol start aspect may be used for changing uplink transmissions between two UEs; switching to an uplink transmission during downlink transmissions of other UEs; and switching to a downlink transmission during uplink transmissions of other UEs. When URLLC downlink transmission are scheduled between ongoing downlink transmissions of another UE, the sub-symbol gap would actually add overhead. Therefore, because the base station has already secured the medium, there is no need to leave a gap between downlink transmissions. It should be noted that a downlink-to-downlink gap (full symbol or sub-symbol) may still be necessary when communications are using mmWave with a directional LBT.

From perspective of UE2 monitoring URLLC downlink data, the UE2 should be able to receive data independently of whether the preemptive communication switching to downlink happens during the uplink of other UEs (in which case there may be a sub-symbol offset) or when it is in between ongoing downlink transmissions (no sub-symbol offsets). As illustrated in FIG. 6, UE2 may attempt multiple hypotheses for the OFDM symbol boundary in order to receive the URLLC downlink transmission. Alternatively, UE2 may receive a signal (e.g., specific or common DCI) that identifies the subframe structure. UE2 may then know the offset at which it should attempt to decode and receive the data at the symbol/sub-symbol boundary.

Figure 11B:
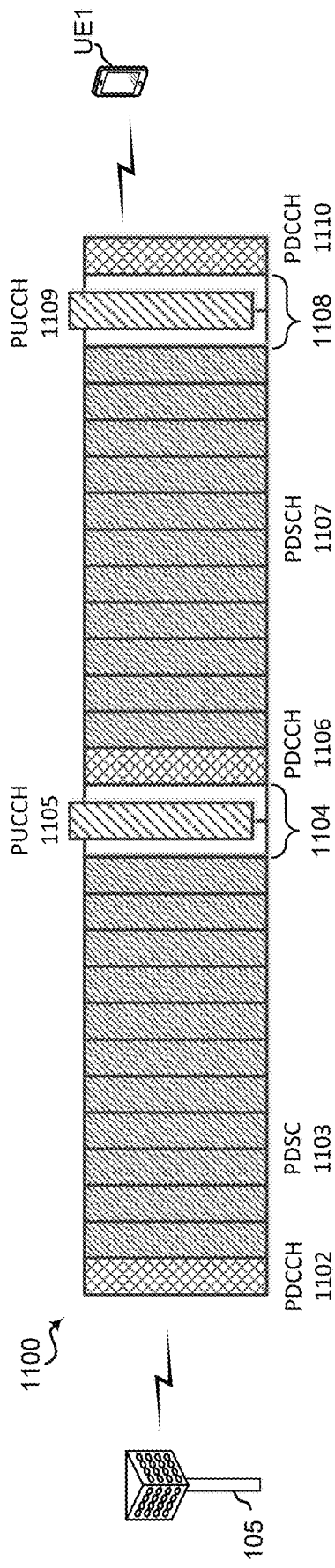
FIGS. 11A and 11B are block diagrams illustrating base station, UE1, and UE2 configured according to aspects of the present disclosure.
Figure 11A:
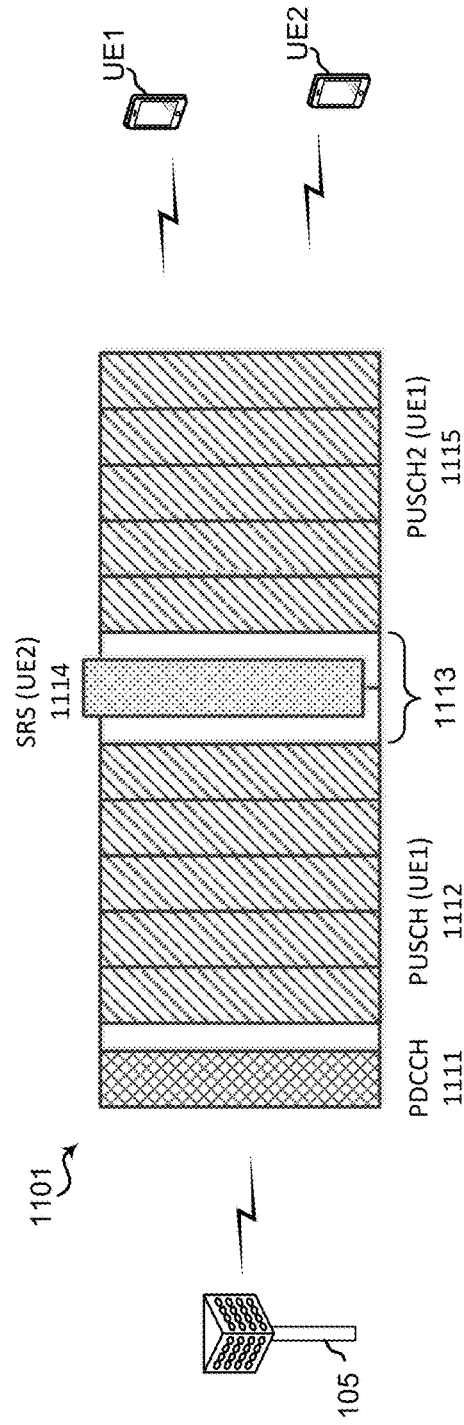

FIGS. 11A and 11B are block diagrams illustrating base station 105, UE1, and UE2 configured according to aspects of the present disclosure. Although the various aspect apply in the context of multiplexing a UE2 uplink mini-slot communications in between other uplink transmissions, the various aspects of the present disclosure may be applicable in multiplexing other channels of a UE or base station in between transmissions of other UEs such as multiplexing sounding reference signal (SRS), acknowledgment (ACK), PUCCH, channel state information reference signals (CSI-RS), TRS, and the like, in between back to back PUSCH of other UEs (FIG. 11A). These sub-symbol level resource allocations can be absorbed into the time domain resource allocation field of the DCI, or can be semi-statically signaled (e.g., RRC), or implicitly signaled. For example, in communications over shared communication channel 1100, uplink channels from UE1 may be allocated using sub-symbol offsets to reduce communication gaps 1104 and 1108 for the uplink communications from UE1. Base station 105 transmits PDCCH 1102, 1106, 1110 and PDSCH 1103 and 1107 using shared communication channel 1100. When UE1 is assigned to transmit PUCCH 1105 and 1108, a sub-symbol offset is used to offset alignment of PUCCH 1105 and 1108. The sub-symbol offset conserves resources by providing communication gaps 1104 and 1108 by base station 105 of two symbols, instead of four, in which a sub-symbol length may be available for UE1 to perform LBT prior to transmitting PUCCH 1105 and 1108. An implicit signaling may provide no sub-symbol offset on downlink-to-downlink communications, and a sub-symbol offset on a downlink-to-other communication.

Additional aspects of the sub-symbol offset may apply for different direction channels transmitted between other communications to the same UE (FIG. 11B). For example, base station 105 transmits PI over shared communication channel 1101 to UE1 during PDCCH 1111 identifying a communication gap 1113 between current communications PUSCH 1112 and 1115 for a priority UE, such as UE2, to transmit its SRS 1114. The sub-symbol offset allows for communication gap 1113 to provide sub-symbol gaps before and after SRS 1114.

As disclosed above, the LBT gaps for URLLC/uplink mini-slot introduce overhead. Various LBT options may be configured for UE2 transmission of mini-slot/URLLC data. For example, LBT may be always performed or not performed in some cases. Where the entirety of the scheduled preemptive communication lies within the transmission opportunity secured by the base station, the UE2 may elect not to perform an LBT procedure. UE2 may determine this based on the length/SCS of the URLLC data, and the gap between start of the URLLC data and the puncture pattern start indicated in the PI. Additionally, the URLLC grant may also indicate whether the UE2 should perform LBT.

For the eMBB UE (UE1) leaving the pre-emption gaps, the UE1 may always perform LBT before resuming communication for both FDM/TDM, may not be required to perform LBT before resuming transmission for both FDM/TDM, may not be required to perform LBT before resuming transmission for FDM, but may perform LBT for TDM, possibly based on the duration of the pre-emption. For example, the determination of whether the UE1 performs LBT may also depend on the SCS/number of contiguous blanked symbols/blanking time in PI. If the size of the gap exceeds a predetermined threshold, then the UE1 would perform LBT. Alternatively, the PI or other control signaling (e.g., DCI) may explicitly indicate whether UE1 should perform LBT or not after the gaps.

The guard period used in NR-SS during uplink mini-slot or URLLC transitions for performing LBT may be indicated to the UE2. The NR URLLC PI can be used to leave the required number of symbol holes punctured for FDM/TDM. Sub-symbol level scheduling can be introduced for the URLLC/mini-slot UE (UE2) to reduce the LBT gap overhead. This can be used for the UE2 (Mini-slot/URLLC UE). The sub-symbol scheduling for UE2 can be part of the DCI time domain resource scheduling. This can also be achieved by increasing the SCS for UE2 and scheduling starting odd symbol. The sub-symbol level scheduling of the various aspects can also be used in NR-SS for other channels like PUCCH, SRS, ACK, etc. This sub-symbol level scheduling helps to reduce the LBT gap overhead and increase the chances of acquiring the channel. The LBT gaps for URLLC transmission/eMBB UE resuming transmission may be based on the length of blanking time/indicated in DCI etc. Combination of the solutions are of course allowed as well.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4, 6, and 9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    receiving, by a user equipment (UE), a preemptive grant for preemptive communications with a serving base station during current communications on a shared communication channel, wherein the preemptive grant includes at least:
        a sub-symbol offset for a beginning of the preemptive communications; and
        a length of the preemptive communications;
    identifying, by the UE, within the preemptive grant, a dynamic sub-carrier spacing (SCS) change for the UE resulting in use of one or more mini-symbols contiguous to one or both of an initial boundary resource or an ending boundary resource of the preemptive communications;
    determining, by the UE, whether to perform a listen before talk (LBT) procedure on the shared communication channel; and
    participating, by the UE, in the preemptive communications according to the preemptive grant; and
    returning, by the UE to a standard SCS for remaining communication resources granted for the preemptive communications.

2. The method of claim 1, further including:
    calculating, by the UE, a minimum gap for an LBT procedure of a neighboring node associated with the current communications, wherein the ending boundary resource is determined to leave the minimum gap for the neighboring node.

3. The method of claim 1, wherein the preemptive communication includes one of:
    uplink transmissions from the UE while the current communications include uplink transmissions from a neighboring UE;
    uplink transmissions from the UE while the current communications include downlink transmissions to the neighboring UE; or
    downlink transmission to the UE while the current communications include uplink transmissions from the neighboring UE.

4. The method of claim 1,
    wherein the preemptive communications include one or more first signals having a first set of characteristics, and
    wherein the current communications include one or more second signals having a second set of characteristics.

5. The method of claim 4,
    wherein the first and second sets of characteristics includes one or more of:
        uplink data transmission;
        downlink data transmission;
        uplink control transmission; or
        downlink control transmission, and
    wherein the current communications includes one of:
        a different characteristic from the preemptive communications between the UE and the serving base station; or
        between a neighboring UE and the serving base station.

6. The method of claim 1, wherein the determining whether to perform the LBT procedure includes one of:

determining not to perform the LBT procedure when the preemptive communications lie completely within a transmission opportunity of the serving base station;
determining to perform the LBT procedure when a communication gap between a start of puncturing of the current communications and beginning of the preemptive communications exceeds a predetermined threshold; or
determining not to perform the LBT procedure when the communication gap is within the predetermined threshold.

7. A method of wireless communication, comprising:
receiving, by a user equipment (UE), a preemptive grant for preemptive communications with a serving base station during current communications on a shared communication channel, wherein the preemptive grant includes at least:
a sub-symbol offset for a beginning of the preemptive communications; and
a length of the preemptive communications;
determining, by the UE, to perform a listen before talk (LBT) procedure on the shared communication channel;
performing the LBT procedure prior to the sub-symbol offset; and
transmitting channel reserving signals on the shared communication channel in response to detecting a successful LBT procedure prior to the sub-symbol offset; and
participating, by the UE, in the preemptive communications according to the preemptive grant.

8. An apparatus for wireless communication, the apparatus comprising:
at least one processor; and
a memory coupled to the at least one processor, wherein the at least one processor is configured to:
receive, by a user equipment (UE), a preemptive grant for preemptive communications with a serving base station during current communications on a shared communication channel, wherein the preemptive grant includes at least:
a sub-symbol offset for a beginning of the preemptive communications; and
a length of the preemptive communications;
identify, by the UE, within the preemptive grant, a dynamic sub-carrier spacing (SCS) change for the UE resulting in use of one or more mini-symbols contiguous to one or both of an initial boundary resource or an ending boundary resource of the preemptive communications:
determine, by the UE, whether to perform a listen before talk (LBT) procedure on the shared communication channel;
participate, by the UE, in the preemptive communications according to the preemptive grant; and
return, by the UE, to a standard SCS for remaining communication resources granted for the preemptive communications.

9. The apparatus of claim 8, wherein the at least one processor is further configured to calculate, by the UE, a minimum gap for an LBT procedure of a neighboring node associated with the current communications, wherein the ending boundary resource is determined to leave the minimum gap for the neighboring node.

10. The apparatus of claim 8, wherein the preemptive communication includes one of:
uplink transmissions from the UE while the current communications include uplink transmissions from a neighboring UE;
uplink transmissions from the UE while the current communications include downlink transmissions to the neighboring UE; or
downlink transmission to the UE while the current communications include uplink transmissions from the neighboring UE.

11. The apparatus of claim 8, wherein:
the preemptive communications include one or more first signals having a first set of characteristics, and
the current communications include one or more second signals having a second set of characteristics.

12. The apparatus of claim 11,
wherein the first and second sets of characteristics includes one or more of:
uplink data transmission;
downlink data transmission;
uplink control transmission; or
downlink control transmission, and
wherein the current communications includes one of:
a different characteristic from the preemptive communications between the UE and the serving base station; or
between a neighboring UE and the serving base station.

13. The apparatus of claim 8, wherein the at least one processor configured to determine whether to perform the LBT procedure is configured to determine one of:
determine not to perform the LBT procedure when the preemptive communications lie completely within a transmission opportunity of the serving base station;
determine to perform the LBT procedure when a communication gap between a start of puncturing of the current communications and beginning of the preemptive communications exceeds a predetermined threshold; or
determine not to perform the LBT procedure when the communication gap is within the predetermined threshold.

14. An apparatus for wireless communication, the apparatus comprising:
at least one processor; and
a memory coupled to the at least one processor, wherein the at least one processor is configured to:
receive, by a user equipment (UE), a preemptive grant for preemptive communications with a serving base station during current communications on a shared communication channel, wherein the preemptive grant includes at least:
a sub-symbol offset for a beginning of the preemptive communications; and
a length of the preemptive communications:
determine, by the UE, to perform a listen before talk (LBT) procedure on the shared communication channel; perform the LBT procedure prior to the sub-symbol offset;
transmit channel reserving signals on the shared communication channel in response to detecting a successful LBT procedure prior to the sub-symbol offset; and
participate, by the UE, in the preemptive communications according to the preemptive grant.

15. A non-transitory computer-readable medium having instructions recorded thereon that, when enacted by one or more computer processors, cause the one or more computer processors to:

receive, by a user equipment (UE), a preemptive grant for preemptive communications with a serving base station during current communications on a shared communication channel, wherein the preemptive grant includes at least:
  a sub-symbol offset for a beginning of the preemptive communications; and
  a length of the preemptive communications;
identify, by the UE, within the preemptive grant, a dynamic sub-carrier spacing (SCS) change for the UE resulting in use of one or more mini-symbols contiguous to one or both of an initial boundary resource or an ending boundary resource of the preemptive communications;
determine, by the UE, whether to perform a listen before talk (LBT) procedure on the shared communication channel; and
participate, by the UE, in the preemptive communications according to the preemptive grant; and
return, by the UE, to a standard SCS for remaining communication resources granted for the preemptive communications.

16. The non-transitory computer-readable medium of claim 15 further comprising instructions recorded thereon that, when enacted by one or more computer processors, cause the one or more computer processors to:
calculate, by the UE, a minimum gap for an LBT procedure of a neighboring node associated with the current communications, wherein the ending boundary resource is determined to leave the minimum gap for the neighboring node.

17. The non-transitory computer-readable medium of claim 15, wherein the preemptive communication includes one of:
uplink transmissions from the UE while the current communications include uplink transmissions from a neighboring UE;
uplink transmissions from the UE while the current communications include downlink transmissions to the neighboring UE; or
downlink transmission to the UE while the current communications include uplink transmissions from the neighboring UE.

18. The non-transitory computer-readable medium of claim 15, wherein:
the preemptive communications include one or more first signals having a first set of characteristics, and
the current communications include one or more second signals having a second set of characteristics.

19. The non-transitory computer-readable medium of claim 18,
wherein the first and second sets of characteristics includes one or more of:
  uplink data transmission;
  downlink data transmission;
  uplink control transmission; or
  downlink control transmission, and
wherein the current communications includes one of:
  a different characteristic from the preemptive communications between the UE and the serving base station; or
  between a neighboring UE and the serving base station.

20. The non-transitory computer-readable medium of claim 15, wherein the instructions recorded thereon that, when enacted by one or more computer processors, cause the one or more computer processors to perform the LBT procedure comprise instructions that, when enacted by one or more computer processors, cause the one or more computer processors to one of:
determine not to perform the LBT procedure when the preemptive communications lie completely within a transmission opportunity of the serving base station;
determine to perform the LBT procedure when a communication gap between a start of puncturing of the current communications and beginning of the preemptive communications exceeds a predetermined threshold; or
determine not to perform the LBT procedure when the communication gap is within the predetermined threshold.

21. A non-transitory computer-readable medium having instructions recorded thereon that, when enacted by one or more computer processors, cause the one or more computer processors to:
receive, by a user equipment (UE), a preemptive grant for preemptive communications with a serving base station during current communications on a shared communication channel, wherein the preemptive grant includes at least:
  a sub-symbol offset for a beginning of the preemptive communications; and
  a length of the preemptive communications;
determine, by the UE, to perform a listen before talk (LBT) procedure on the shared communication channel;
perform the LBT procedure prior to the sub-symbol offset;
transmit channel reserving signals on the shared communication channel in response to detecting a successful LBT procedure prior to the sub-symbol offset; and
participate, by the UE, in the preemptive communications according to the preemptive grant.

22. An apparatus for wireless communication, the apparatus comprising:
means for receiving, by a user equipment (UE), a preemptive grant for preemptive communications with a serving base station during current communications on a shared communication channel, wherein the preemptive grant includes at least:
  a sub-symbol offset for a beginning of the preemptive communications; and
  a length of the preemptive communications;
means for identifying, by the UE, within the preemptive grant, a dynamic sub-carrier spacing (SCS) change for the UE resulting in use of one or more mini-symbols contiguous to one or both of an initial boundary resource or an ending boundary resource of the preemptive communications;
means for determining, by the UE, whether to perform a listen before talk (LBT) procedure on the shared communication channel; and
means for participating, by the UE, in the preemptive communications according to the preemptive grant; and
means for returning, by the UE to a standard SCS for remaining communication resources granted for the preemptive communications.

23. The apparatus of claim 22, further including:
means for calculating, by the UE, a minimum gap for an LBT procedure of a neighboring node associated with the current communications, wherein the ending boundary resource is determined to leave the minimum gap for the neighboring node.

24. The apparatus of claim 22, wherein the preemptive communication includes one of:
- uplink transmissions from the UE while the current communications include uplink transmissions from a neighboring UE;
- uplink transmissions from the UE while the current communications include downlink transmissions to the neighboring UE; or
- downlink transmission to the UE while the current communications include uplink transmissions from the neighboring UE.

25. The apparatus of claim 22,
wherein the preemptive communications include one or more first signals having a first set of characteristics, and
wherein the current communications include one or more second signals having a second set of characteristics.

26. The apparatus of claim 25,
wherein the first and second sets of characteristics includes one or more of:
- uplink data transmission;
- downlink data transmission;
- uplink control transmission; or
- downlink control transmission, and wherein the current communications includes one of:
- a different characteristic from the preemptive communications between the UE and the serving base station; or
- between a neighboring UE and the serving base station.

* * * * *